(12) United States Patent
Paul et al.

(10) Patent No.: US 7,795,336 B2
(45) Date of Patent: Sep. 14, 2010

(54) LOW APPLICATION TEMPERATURE HOT MELT ADHESIVE

(75) Inventors: Charles W. Paul, Madison, NJ (US); Matthew L. Sharak, Franklin Park, NJ (US); Leisa A. Ryan, Ashfiled (AU); Maria Xenidou, Flemington, NJ (US); Michael G. Harwell, Hillsborough, NJ (US); Qiwei He, Belle Mead, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 10/273,836

(22) Filed: Oct. 18, 2002

(65) Prior Publication Data

US 2004/0077240 A1    Apr. 22, 2004

(51) Int. Cl.
*C08L 91/06* (2006.01)
*C08K 5/01* (2006.01)
*B32B 27/04* (2006.01)
*B32B 7/12* (2006.01)

(52) U.S. Cl. .................. 524/277; 524/489; 442/150; 156/327

(58) Field of Classification Search ............... 524/277, 524/489; 442/150; 156/327
See application file for complete search history.

(56) References Cited

U.S. PATENT DOCUMENTS

| 3,932,329 | A | | 1/1976 | Lakshmanan |
| 5,387,623 | A | * | 2/1995 | Ryan et al. .............. 523/124 |
| 5,939,483 | A | * | 8/1999 | Kueppers ................. 524/487 |
| 5,942,569 | A | | 8/1999 | Simmons et al. |

* cited by examiner

*Primary Examiner*—William K Cheung
(74) *Attorney, Agent, or Firm*—Sun Hee Lehmann

(57) ABSTRACT

A low application temperature rubber-based hot melt adhesive having properties particularly well suited for use in the construction of disposable articles has been invented. The adhesive comprises a styrene block copolymer and a type of wax in an amount effective to produce a viscosity at 120° C. of below about 10,000 centipoises, a cube flow at 130° F. (54° C.) of less than about 300%, a DSC crystallization temperature of less than about 75° C. and a storage modulus of less than about $1.0 \times 10^7$ dynes/cm$^2$ at 10 rads/sec (25° C.).

18 Claims, No Drawings

LOW APPLICATION TEMPERATURE HOT MELT ADHESIVE

FIELD OF THE INVENTION

The invention relates to a hot melt adhesive, more specifically a low application temperature hot melt adhesive. The adhesive is particularly useful in the construction of nonwoven articles.

BACKGROUND OF THE INVENTION

Adhesives based on block copolymer rubbers have found wide-spread use in nonwoven construction applications, e.g., disposable absorbent articles such as diapers, feminine hygiene articles, and adult incontinence devices. These products are typically applied at temperatures above 130° C. and often above 150° C. Lowering the application temperature of adhesives used in the manufacture of such products below 120° C. would improve the thermal aging in application equipment and reduce issues with heat sensitive or lighter basis weight substrates. However, in order to apply the adhesive below 120° C. using current application technology the viscosity must be low enough to spray and extrude cleanly. To lower viscosity, lower molecular weight polymers and higher levels of diluent have been used at the expense of performance. These approaches result in lower mechanical strength and more importantly less resistance to flow at high temperature. While the use of waxes to act as diluents as well as crystalline reinforcing agents is known, this approach suffers from a reduction in the effective open time the adhesive is capable of forming adequate bonds in the laminating processes used to make disposable articles.

There is thus a need for a hot melt adhesive that can be applied at low temperature, i.e., below about 120° C., which has adequate open time for bonding and has a high resistance to flow at elevated temperatures. Such attributes would make the adhesives particularly well-suited for use in the manufacture of disposable articles. The invention fulfills this need.

SUMMARY OF THE INVENTION

The invention provides a low application temperature hot melt adhesive comprising a block copolymer rubber and a wax. The type and amount of wax used in the adhesive is selected to so as to produce a viscosity at 120° C. of below about 10,000 centipoises, a cube flow at 130° F. (54° C.) of less than about 300%, a DSC crystallization temperature of less than about 75° C. and a storage modulus of less than about $1.0 \times 10^7$ dynes/cm$^2$ at 10 rads/sec (25° C.).

Preferred block copolymer rubbers that can be used in the practice of the invention include SBS polymers, SIS polymers, SEBS polymers, SEPS polymers as well as various mixtures thereof. In preferred embodiments, the wax is a crystalline wax having a melting point of greater than about 165° F. (74° C.), more preferably greater than about 175° F. (79° C.). Preferred adhesive formulations will also contain a compatible tackifier, a plasticizer and an antioxidant.

In one embodiment, the adhesive comprises 10 to about 25 wt % of a styrene block copolymer, from about 40 to about 70 wt % of a tackifier having a softening point of greater than about 80° C., from about 15 to about 30 wt % of a placticizer, from about 1 to about 10 wt % of a wax having a melting point of greater than about 165° F., more preferably greater than about 175° F. and up to about 2 wt % of an antioxidant.

The invention also provides articles of manufacture comprising the adhesive. The adhesive is particularly useful in the manufacture of nonwoven articles, including nonwoven absorbent garments, and for use in bottle labeling applications and the like.

The invention also provides a process for bonding a substrate to a similar or dissimilar substrate using the adhesive. The process comprises applying to at least a portion of at least a first substrate a molten hot melt, bringing a second substrate in contact with the adhesive present on the first substrate, and allowing the adhesive to solidify, whereby the first substrate is bonded to the second substrate.

The invention further provides articles of manufacture comprising the adhesive. The properties of the adhesive makes it particularly useful in the manufacture of nonwoven articles, e.g., disposable absorbent articles such as diapers and the like, and as a labeling adhesive.

DETAILED DESCRIPTION OF THE INVENTION

It has now been discovered that the incorporation of a wax having specific properties into a rubber polymer based hot melt adhesive system may be used to balance the open time for bonding and the resistance to flow at elevated temperatures encountered in the distribution chain for nonwoven disposable articles. More specifically, it has been found that open time is significantly affected by the crystallization temperature of the wax in the adhesive formulation. A balance in adhesive open time and resistance to cold flow at end-use storage temperatures is achieved by using a crystalline reinforcing phase with specific thermal properties.

The wax is used in an amount sufficient to produce a viscosity at 120° C. of below about 10,000 centipoises, a cube flow at 130° F. of less than about 300%, more preferable less than about 150%, a DSC crystallization temperature of less than about 75° C. and a storage modulus (G') of less than about $1.0 \times 10^7$ dynes/cm$^2$ at 10 rads/sec (25° C.).

Whether the adhesive meets the above-described criteria can be readily determined using the procedures described herein. Specifically, the stability of bond strength of the adhesive on aging under distribution and storage temperatures is related to the resistance of the adhesive to flow in the bond line. Resistance of an adhesive to flow can be approximated using the Cube Flow test method described in the Examples. Whether the adhesive has the necessary open time necessary for bonding can be measured using a differential scanning calorimeter (DSC) also described in the Examples. Due to the reduced polymer molecular weight and content in the composition a melt viscosity of below 10,000 cps at 120° C. can be achieved. This parameter can be measured using a standard Brookfield viscometer as is conventional in the art. When bonding flexible substrates together it is desirable to have some degree of pressure sensitivity and flexibility. The modulus of elasticity (G') is an indication of the stiffness of the adhesive and can be measured as is conventional in the art (see also the Examples).

The adhesives of the invention are low application temperature hot melt adhesive formulations, i.e., formulations that can be applied at temperatures below about 130° C., preferable below about 120° C.

Suitable base polymers for use in formulating the hot melt adhesives of the invention are rubbery block copolymers, as well as blends thereof. Hot melt adhesive compositions based styrene-butadiene, styrene-isoprene, or styrene-ethylene-butylene A-B-A or A-B-A-B block copolymers or mixtures thereof may be used. In addition to the base polymer, the hot melt adhesive compositions of the invention will comprise a wax and will generally also comprise a compatible tackifier and/or plactisizer and typically additives such as stabilizers, antioxidants, pigments and the like. The wax selected for use in the adhesive formulations of the invention will be selected and will be added in amounts sufficient to provide an adhesive having a viscosity at 120° C. of below about 10,000 centipoises, a cube flow at 130° F. of less than about 300%, a DSC crystallization temperature of less than about 75° C. and a storage modulus (G') of less than about $1.0 \times 10^7$ dynes/cm$^2$ at 10 rads/sec (25° C.).

In more detail, the polymers used to prepare the adhesive of the invention are based on rubbery block copolymers. These polymers include the block or multi-block copolymers having the general configuration: A-B-A or A-B-A-B-A-B- wherein the polymer blocks A are non-elastomeric polymer blocks which, as homopolymers have glass transition temperatures above 20° C., while the elastomeric polymer blocks B are butadiene or isoprene or butadiene isoprene which is partially or substantially hydrogenated. Both linear and/or branched may be used in the practice of the invention. Typical branched structures contain an elastomeric portion with at least three branches that can radiate out from a central hub or can be otherwise coupled together.

The non-elastomeric blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric polymer blocks may be derived from alpha olefins, alkylene oxides, acetals, urethanes, etc.

The elastomeric block component of the copolymer may be isoprene or butadiene that may or may not be hydrogenated. This hydrogenation may be either partial or substantially complete. Selected conditions may be employed for example to hydrogenate the elastomeric block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete.

Typical of the rubbery block copolymers useful herein are the polystyrene-polybutadiene-polystyrene (SBS), polystyrene-polyisoprene-polystyrene (SIS) and e.g., polystyrene-poly(ethylenebutylene)-polystyrene (SEBS) and polystyrene-poly-(ethylenepropylene)-polystyrene (SEPS). These copolymers may be prepared using methods taught, for example, in U.S. Pat. Nos. 3,239,478; 3,427,269; 3,700,633; 3,753,936; and 3,932,327. Alternatively, they may be obtained from Shell Chemical Co. under the trademarks Kraton 1101, 1102, 1107, 1650, 1652 and 1657; from Enichem under the Europrene Sol-T tradenames; and from Firestone under the tradename Stereon 840A. Mixtures of copolymers, such as blends of SBS and SIS, may also be used.

The block copolymer component will generally be present at a level of from about 10 to about 25% by weight of the adhesive composition, more typically at levels of at least about 14%.

The hot melt adhesive of the present invention will also comprise a wax. Petroleum based, conventional wax and polyolefin copolymers may be used in the practice of the invention. The term petroleum derived wax includes both paraffin and microcrystalline waxes having melting points within the range of from about 130° F. to about 225° F. as well as synthetic waxes such as low molecular weight polyethylene or Fisher-Tropsch waxes. Most preferred are microcrystalline waxes with a melting point of at least about 165° F., more preferably at least about 175° F. and greater. Non-limiting examples include MICROSERE 5999 with melting point of 195° F. and MICROSERE 5812 with melting point of 185° F., both available from IGI. Amounts of microcrystalline wax necessary to achieve the desired properties will typically range from about 1 to about 10 wt % of a wax. Amounts of about 5% by weight will typically be sufficient.

Tackifying resins useful in the adhesive compositions of this invention include hydrocarbon resins, synthetic polyterpenes, rosin esters, natural terpenes, and the like. The tackifying agent will generally be present at a level of from about 40 to about 70% by weight of the adhesive composition and preferably at a level of at least about 60% by weight.

More particularly, and depending upon the particular base polymer, the useful tackifying resins may include any compatible resins or mixtures thereof such as natural and modified rosins including, for example, as gum rosin, wood rosin, tall oil rosin, distilled rosin, hydrogenated rosin, dimerized rosin, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 80° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Mixtures of two or more of the above described tackifying resins may be required for some formulations. Also included are the cyclic or acyclic $C_5$ resins and aromatic modified acyclic or cyclic resins.

Preferred tackifiers are synthetic hydrocarbon resins derived from petroleum. Non-limiting examples include aliphatic olefin derived resins such as those available from Goodyear under the Wingtack® tradename and the Escorez® 1300 series from Exxon. A common $C_5$ tackifying resin in this class is a diene-olefin copolymer of piperylene and 2-methyl-2-butene having a softening point of about 95° C. This resin is available commercially under the tradename Wingtack 95 and is prepared by the cationic polymerization of a mixture containing appoximately 60% piperylene, 10% isoprene, 5% cyclo-pentadiene, 15% 2-methyl-2-butene and about 10% dimer, as taught in U.S. Pat. No. 3,577,398. The resins normally have ring and ball softening points as determined by ASTM method E28 between about 20° C. and 150° C. Also useful are $C_9$ aromatic/aliphatic olefin-derived resins available from Exxon in the Escorez 2000 series. Hydrogenated hydrocarbon resins are especially useful. These hydrogenated resins include such resins as the Escorez 5000 series of hydrogenated cycloaliphatic resins from Exxon, hydrogenated $C_9$ and/or $C_5$ resins such as Arkon® P70, P90, P115, P125 supplied by Arakawa Chemical, hydrogenated aromatic hydrocarbon resins such as Regalrez® 1018, 1085 and the Regalite® R series of resins from Hercules Specialty Chemicals. Other useful resins include hydrogenated polyterpenes such as Clearon® P-105, P-115 and P-125 from the Yasuhara Yushi Kogyo Company of Japan. Mixtures of such tackifying agents may also be used.

Various plasticizing or extending oils are also present in the composition in amounts of 15% to about 30%, typically about 21%, by weight. Suitable plasticizing or extending oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Examples of oils suitable for use herein include LUMINOL T350, a mineral oil available from Petrocanada and KAYDOL OIL available from Witco Corporation. Naphthenic oils, such as Calsol 5550, available from Calumet is also useful.

An antioxidant or stabilizer may also be included in the adhesive compositions described herein in amounts of up to about 3% by weight, more typically in amounts of about 0.5%. Among the stabilizers or antioxidants usefull herein are the hindered phenols or hindered phenols in combination with a secondary antioxidant such as distearyl thiodipropionate ("DSTDP") or dilauryl thio-dipropionate ("DLTDP"). Representative hindered phenols include: 1,3,5-trimethyl 2,4, 6-tris (3,5-di-tert-butyl-4-hydroxybenzyl)benzene; pentaerythrityl tetrakis-3(3,5-di-tert-butyl-4-hydroxyphenyl) propionate; pentaerythritol tetrakis (3-lauryl thiodipropionate); n-octadecyl-3,5-ditert-butyl-4-hydroxyphenol)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-ditert-butyl-4-hydroxy-benzoate; and sorbitol hexa[3-(3,5-di-tert-butyl-4-hydroxyphenyl)-propionate]. Preferred are IRGAFOS 168, a secondary antioxidant available from Ciba and IRGANOX 1010, a hindered phenol primary antioxidant available from Ciba-Geigy. Other antioxidants include ETHANOX 330, a hindered phenol from Albermarle; SANTOVAR, a 2,5 ditert-amyl hydroquinone from Monsanto; and NAVAGARD P a tris (p-nonylphenyl)phosphite from Uniroyal.

Other additives conventionally used in hot melt adhesives to satisfy different properties and meet specific application requirements also may be added to the adhesive composition of this invention. Such additives include, for example, fillers, pigments, flow modifiers, dyestuffs, which may be incorporated in minor or larger amounts into the adhesive formulation, depending on the purpose.

Hot melt adhesives may be prepared using techniques known in the art. Typically, the adhesive compositions are prepared by blending the components in the melt at a temperature of about 100° to 200° C. until a homogeneous blend is obtained, generally about two hours. Various methods of blending are known and any method that produces a homogeneous blend is satisfactory.

The properties of the invention make it particularly useful in nonwoven applications and, e.g., in bottle labeling or other applications involving plastic bonding or removable pressure sensitive adhesive applications.

The adhesive is applied to a substrate while in its molten state and cooled to harden the adhesive layer. The adhesive product can be applied to a substrate such as a nonwoven article by a variety of methods including coating or spraying in an amount sufficient to cause the article to adhere to another substrate such as tissue, nonwoven, or an unrelated material such as a low density polyolefin or other conventionally employed substrates.

In one embodiment of the invention, a disposable absorbent product is provided. The disposable absorbent product will typically comprises (1) a liquid-permeable topsheet, (2) a liquid-impermeable backsheet, which topsheet may be attached to the backsheet, (3) an absorbent structure positioned between the topsheet and the backsheet, and (4) a hot melt adhesive having the properties described herein.

The absorbent structure will typically comprise a nonwoven fabric. A nonwoven fabric is defined as an interlocking fiber network characterized by flexibility, porosity and integrity. The individual fibers used to compose the nonwoven fabric may be synthetic, naturally occurring, or a combination of the two. The individual fibers may be mechanically, chemically, or thermally bonded to each other. Nonwovens are used commercially for a variety of applications including insulation, packaging (e.g., foods such as meat), household wipes, surgical drapes, medical dressings, and in disposable articles such as diapers, adult incontinent products and sanitary napkins. Tissue is a closely related material in which the individual fibers may or may not be chemically bonded to one another.

The adhesives of the invention may be used to adhere the nonwoven or tissue to another substrate or component. The second substrate may be another nonwoven, tissue, or an unrelated material such as, for example, polypropylene. The adhesive may be used to attach the topsheet to the backsheet. Alternatively, the adhesive may be used to adhere either the topsheet or the backsheet to other components of the disposable absorbent product, such as tissue layers, leg flaps, fastening ears, tapes, or tabs, or other components typically used to construct a disposable absorbent product that are well known to one skilled in the art.

Those skilled in the art will recognize materials suitable for use as the topsheet and backsheet.

Exemplary of materials suitable for use as the topsheet are liquid-permeable materials, such as spunbonded polypropylene or polyethylene having a basis weight of from about 15 to about 25 grams per square meter.

Backsheets often used in disposable absorbent products are generally prepared from liquid-impermeable materials which function to contain liquids, such as water, urine, menses, or blood, within the absorbent core of the disposable absorbent product and to protect bedding and/or a wears' outer garments from soiling. Materials useful as a backsheet in a disposable absorbent product are generally impermeable to liquid but are permeable to vapor. Examples are liquid-impervious materials such as polyolefin films, e.g., polypropylene and polyethylene, as well as vapor-pervious materials, such as microporous polyolefin films, sometimes referred to as breathable films.

A particularly desirable backsheet material is a film comprising a polyolefin polymer such as a linear low density polyethylene and a filler. As used herein a "filler" is meant to include particulates and other forms of materials which can be added to the film polymer extrusion blend and which will not chemically interfere with or adversely affect the extruded film but which are able to be uniformly dispersed throughout the film. When the film is stretched during processing, the filler generally causes a network of holes to be formed in the film. Such holes are generally small enough to prevent the passage of a liquid, but are generally large enough to allow vapor to pass through the holes. Generally the fillers will be in particulate form and usually will have somewhat of a spherical shape with average particle sizes in the range of about 0.1 to about 7 microns. Both organic and inorganic fillers may be used in the practice of the invention provided that they do not interfere with the film formation process. Examples of fillers include calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivatives, chitin and chitin derivatives.

The following examples are presented for purpose of illustration and not limitation.

EXAMPLES

In the examples, the tests used to evaluate the adhesive properties were conducted as follows.

DSC (Differential Scanning Calorimeter)

Using a TA Instruments DSC 2920 or similar equipment a sample of adhesive between 5 and 10 mg in weight was prepared. The sample was loaded into the DSC with a blank pan as a reference and brought to a temperature of 25° C. The sample was heated to 130° C. at 10° C./min. and held at 130° C. for 1 minute. The sample was then cooled to 0° C. at 10° C./min. The temperature of the peak(s) on the cooling curve was measured and the value recorded as crystallization temperature.

Cube Flow @130° F.

Molten adhesive was poured into a release mold to form a 1" cube and allowed to condition at 25° C. for 24 hours. The cube was then removed from the mold and placed on standard graph paper (1 cm squares or similar). The cube was then placed in a controlled oven at 130° F. for 24 hours. The cube was then removed from the oven and the number of squares covered by adhesive was recorded. The percent flow was calculated using the following equation.

% flow=(final number of cubes−initial number of cubes)/initial number of cubes

Peel and Aged Peel

A high speed web laminator was used to construct the peel samples in the following manner. Molten adhesive was applied using a standard EP-11 Nordson slot head at 13 gsm coating weight to a landing zone nonwoven substrate, which was then combined using a compression nip to a second SMS nonwoven. The laminating conditions were such that the open time of the bonding process was 4 seconds.

On a standard Instron tensile test machine, laminate samples were peeled in T-peel geometry at 12"/min. The average peel from approximately 6 inches of bond was recorded.

Samples were allowed to age in a 130° F. oven for 1 week. The samples were removed samples and allowed to equilibrate for 24 hours at 25° C. after which the peel test was repeated.

Viscosity

Using a standard Brookfield viscometer, adhesives viscosity at 120° C. was measured and result recorded.

Rheology

A Rheometrics Dynamic Mechanical Analyzer (Model RDA 700) was used to obtain the elastic (G') modulus versus temperature. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') was calculated by the software from the torque and strain data.

Example 1

Nine adhesive samples (Samples 1 and 2 and Comparative Samples A-G) were formulated using techniques known in the art. The Samples comprised a styrene block copolymer, mineral oil, tackifying resin, antioxidant and the wax shown in Table 1. An exemplary procedure involves placing approximately half of the total tackifying resin in a jacketed mixing kettle, which is equipped with rotors, and raising the temperature to a range from about 100° C. to 200° C. The precise temperature utilized depends on the softening point of the particular tackifying resin. When the resin has melted, stirring is initiated and the block polymer, wax, oil and antioxidant are added together with any optional additives whose presence may be desired. Mixing and heating are continued until a smooth homogeneous mass is obtained.

TABLE 1

| Samples* | Wax |
|---|---|
| Sample 1 | 5% Paraflint C-80 Fisher-Tropsch wax (176° F. MP) |
| Sample 2 | 5% of Microsere 5999 microcrystalline wax (195° F. MP) |
| Comparative Sample A | 3% Paraflint H-4 Fisher-Tropsch wax (202° F. MP) |
| Comparative Sample B | 1% Paraflint H-4 |
| Comparative Sample C | 3% Pacemaker 53 paraffin wax (149° F. MP) |
| Comparative Sample D | 3% AC-400 EVA wax |
| Comparative Sample E | No wax |
| Comparative Sample F | No wax |
| Comparative Sample G | No wax |

Performance of the adhesives was evaluated using the tests described above and the results recorded. Performance results are shown in Table 2.

TABLE 2

| Product | DSC crystallization temperature (° C.) | Cube flow @ 130° F. (% flow) | Initial peel (g/50 mm) | Aged peel 1 wk 130° F. (g/50 mm) | Viscosity @ 120° C. | G' @ 25° C. (dyn/cm²) |
|---|---|---|---|---|---|---|
| Sample 1 | 60.3 | 0 | 808 | 914 | 3925 | 3.0 × 10⁶ |
| Sample 2 | 66.2 | 0 | 780 | 708 | 3015 | 7.0 × 10⁶ |
| Sample A | 78.9 | 19 | 440 | 762 | 2300 | 1.3 × 10⁶ |
| Sample B | 88.9 | >500 | 1100 | 700 | 8500 | 0.5 × 10⁶ |
| Sample C | 33.5 | 344 | not tested | not tested | 2300 | not tested |
| Sample D | none | 313 | not tested | not tested | 3300 | not tested |
| Sample E | none | >500 | 1253 | 488 | 2300 | 0.3 × 10⁶ |
| Sample F | none | 125 | 679 | 877 | 24,000 | 0.4 × 10⁶ |
| Sample G | none | 0 | 827 | 872 | 42,000 | 0.4 × 10⁶ |

From the results shown in Table 2, it can be seen that the use of a wax selected in accordance with the invention provides an adhesive having the required open time (measured using DSC) necessary for bonding and the resistance to flow at elevated temperatures (measured using the Cube Flow test). These properties make the adhesive particularly well suited for use in laminating processes to make disposable articles.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hot melt adhesive formulated for application at a temperature of less than about 120° C., said adhesive comprising a styrene block copolymer and a type and amount of wax effective to produce an adhesive having a viscosity at 120° C. of below about 10,000 centipoises, a cube flow at 54° C. of less than about 300%, a DSC crystallization temperature of less than about 75° C., and a storage modulus of less than about $1.0 \times 10^7$ dynes/cm² at 10 rads/sec (25° C.), wherein the styrene block copolymer is present in amounts of from about 10 to about 25 wt % and wherein said effective amount of wax is less than 10 wt %.

2. The adhesive of claim 1 wherein said wax has a melting point of greater than about 74° C.

3. The adhesive of claim 2 wherein the wax comprises a mixture of waxes.

4. The adhesive of claim 1 comprising a SBS polymer, a SIS polymer, a SEBS polymer and/or a SEPS polymer.

5. The adhesive of claim 1 wherein the styrene block copolymer is a blend of SBS and SIS.

6. The adhesive of claim 1 further comprising a tackifier, a plasticizer and/or an antioxidant.

7. The adhesive of claim 6 comprising at least about 1 wt % of said wax.

8. The adhesive of claim 7 comprising from about 40 to about 70 wt % of a tackifier, from about 15 to about 30 wt % of a plasticizer, and up to about 2 wt % of an antioxidant.

9. The adhesive of claim 6 wherein the tackifier has a softening point of greater than about 80° C.

10. The adhesive of claim 1 wherein said wax has a melting point of greater than about 165° F.

11. The adhesive of claim 10 wherein said wax is a crystalline wax.

12. The adhesive of claim 1 comprising about 14 wt % of said styrene block copolymer and about 5 wt % of said wax.

13. The adhesive of claim 1 where in the styrene block copolymer is SBS.

14. The adhesive of claim 10 wherein said wax has a melting point of greater than about 165° F.

15. A hot melt adhesive formulated for application at a temperature of less than about 120° C., said adhesive comprising
 a styrene block copolymer,
 a type and amount of wax effective to produce an adhesive having a viscosity at 120° C. of below about 10,000 centipoises, a cube flow at 54° C. of less than about 300%, a DSC crystallization temperature of less than about 75° C., and a storage modulus of less than about $1.0 \times 10^7$ dynes/cm² at 10 rads/sec (25° C.),
 a tackifier, and
 a plasticizing oil,
wherein said styrene block copolymer is present in amounts of from about 10 to about 25 wt %, said effective amount of wax is less than 10 wt %, said tackifier is present in amounts of from about 40 to about 70 wt %, and said plasticizing oil is present in amounts of from about 15 to about 30 wt %.

16. The adhesive of claim 14, further comprising up to about 2 wt % of an antioxidant.

17. The adhesive of claim 14 wherein said wax is a microcrystalline wax having a melting point of greater than about 165° F.

18. The adhesive of claim 15 comprising about 14 wt % of said styrene block copolymer and about 5 wt % of said wax.

* * * * *